United States Patent [19]

Gregory et al.

[11] Patent Number: 5,189,154
[45] Date of Patent: Feb. 23, 1993

[54] ANIONIC PHTHALOCYANINE COMPOUNDS

[75] Inventors: Peter Gregory, Bolton; Ronald W. Kenyon, Manchester; Christine Millard, Cheshire, all of England

[73] Assignee: Imperial Chemical Industries PLC, London, England

[21] Appl. No.: 720,296

[22] Filed: Jun. 28, 1991

[30] Foreign Application Priority Data

Jul. 26, 1990 [GB] United Kingdom ............... 9016451

[51] Int. Cl.$^5$ ............................................. C09B 47/04
[52] U.S. Cl. .................................. 540/126; 540/123; 540/124; 540/125; 540/130; 540/140
[58] Field of Search ............... 540/123, 124, 125, 126, 540/130

[56] References Cited

FOREIGN PATENT DOCUMENTS 61-087759 5/1986 Japan .
2034739 6/1980 United Kingdom .

OTHER PUBLICATIONS

Chemical Abstracts, 77(12):76686P, (1968), "Reactive Triazine Dyes".
Patent Abstracts of Japan, vol. 9, No. 233, Sep. 19, 1985, Abstracts, JO 112381A and JO 1190770A.
Murakami et al., "Development of New Dyestuffs for Ink Jet Printing", S.P.S.E., 5th International Congress on Ink Jet Printing, Oct., 1989.

*Primary Examiner*—Mukund J. Shah
*Assistant Examiner*—Jyothsna Venkat
*Attorney, Agent, or Firm*—Cushman, Darby & Cushman

[57] ABSTRACT

Anionic phthalocyanine compounds which, in the free acid form, have the Formula (1):

$$Pc(SO_3H)_r(SO_2-NR^1-L-NR^2-X-NR^3-G)_q \qquad (1)$$

The compounds are useful as the colored component of inks, particularly those used in ink jet printing.

17 Claims, No Drawings

ANIONIC PHTHALOCYANINE COMPOUNDS

This specification describes an invention relating to anionic compounds and particularly to anionic phthalocyanine compounds which are useful as the coloured component of inks, particularly inks used in ink jet printing.

According to the present invention there are provided anionic phthalocyanine compounds which, in the free acid form, have the structure shown in Formula (1):

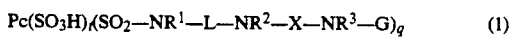

wherein:
Pc is a metal-containing phthalocyanine nucleus;
$R^1$, $R^2$ and $R^3$ are each independently H, alkyl, substituted alkyl, alkenyl, substituted alkenyl, aralkyl or substituted aralkyl;
L is a divalent organic linking group;
each X independently is carbonyl or a group of formula (2), (3) or (4):

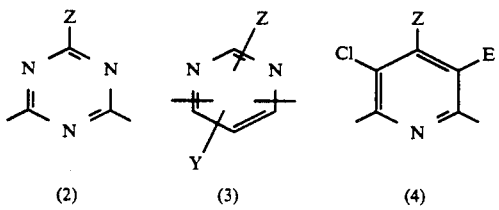

each Z independently is $NR^4R^5$, $SR^6$ or $OR^6$;
each Y independently is H, Cl, Z, $SR^7$ or $OR^7$;
each E independently is Cl or CN;
$R^4$, $R^5$, $R^6$ and $R^7$ are each independently H, alkyl, substituted alkyl, aryl, substituted aryl, aralkyl or substituted aralkyl or $R^4$ and $R^5$ together with the nitrogen atom to which they are attached form a 5 or 6 membered ring;
G is a colourless organic radical substituted by one or two groups selected from COSH and COOH; and
$(t+q)$ is from 3 to 4 inclusive.

It is preferred that the compound of Formula (1) contain at least as many groups selected from —COSH and —COOH as —SO$_3$H groups.

The preferred compounds of Formula (1) are cyan coloured compounds and are useful as dyes.

The metal present in the metal-containing phthalocyanine nucleus may be any of the metals known to be found in complex association with phthalocyanine nuclei, for example Li, Na, K, Mg, Ca, Ba, Al, Si, Sn, Pb or Rh; however it is preferred that the metal is Sc, Ti, V, Cr, Mn, Fe, Co, or Zn, especially Ni or Cu. When the metal is tri- or tetra-valent, one or two Cl atoms may be attached thereto.

$R^1$, $R^3$, $R^6$ and $R^7$ are preferably each independently selected from H, $C_{1-4}$-alkyl and hydroxy-$C_{1-4}$-alkyk, more preferably H, and $C_{1-4}$-alkyl. It is particularly preferred that $R^1$ and $R^3$ are H.

$R^2$ is preferably H, $C_{1-4}$-alkyl, or substituted $C_{1-4}$-alkyl. When $R^2$ is substituted alkyl it is preferably a hydroxy-$C_{1-4}$-alkyl.

$R^4$ and $R^5$ are preferably each independently H, $C_{1-4}$-alkyl, and substituted $C_{1-4}$-alkyl in which the substituents are preferably selected from —COOH, —SO$_3$H and especially —OH.

When $R^4$ and $R^5$ together with the nitrogen atom to which they are attached form a 5 or 6 membered ring, they preferably form a morpholine or piperidine ring.

When X is of Formula (3) it is preferred that Z is attached to the carbon atom between the two ring nitrogen atoms and that Y is para with respect to Z. X is preferably of Formula (2).

Z is preferably $NR^4R^5$ or $OR^6$, more preferably HO($C_{1-4}$-alkylene)NH, for example HOC$_2$H$_4$NH, or OH.

$(t+q)$ is preferably 4.

It is preferred that the value of q is greater than or equal to the value of t.

The identity of the divalent organic linking group L is not critical providing it does not interfere adversely with the performance of the dye. As examples of divalent organic linking groups represented by L there may be mentioned:

(a) divalent aliphatic radicals, preferably those containing from 2 to 6 carbon atoms, such as ethylene, trimethylene, propylene, tetramethylene, alpha:beta-dimethylethylene and hexamethylene radicals;

(b) divalent aromatic homocyclic radicals in which at least one of the terminal links is through an aliphatic carbon atom, for example as in the benzylene —C$_6$H$_4$.CH$_2$— or the xylylene —CH$_2$C$_6$H$_4$CH$_2$— group;

(c) divalent monocyclic or fused polycyclic aromatic radicals, for example of the benzene, naphthalene, anthraquinone or fluorene series, such as

| | |
|---|---|
| 1,3- or 1,4-phenylene | 2-nitro-1,4-phenylene |
| 3-sulpho-1,4-phenylene | 4-methoxy-1,3-phenylene |
| 4-sulpho-1,3-phenylene | 4-nitro-1,3-phenylene |
| 2-carboxy-1,4-phenylene | 2-chloro-1,4-phenylene |
| 4-carboxy-1,3-phenylene | 3,7-disulpho-1,5-naphthylene |
| 2-methoxy-1,4-phenylene; | |

(d) divalent radicals wherein the terminal bonds are attached to carbon atoms of two phenyl or naphthalene nuclei which are joined together either through a direct link or through an atom or chain of atoms which may form a homocyclic or heterocyclic ring. Of this type, there may be mentioned as examples divalent radicals derived from

| | |
|---|---|
| diphenyl | azobenzene |
| diphenyloxide | diphenyloxadiazole |
| diphenylamine | benzanilide |
| diphenylsulphide | diphenylurea |
| diphenylsulphone | 1,2-bis(phenylcarbamyl)ethylene |
| diphenylmethane | 1,4-bis-(phenylcarbamyl)butadiene |
| diphenylketone | 1,2-bis-(phenylcarbamyl)ethane |
| diphenylethane | 1,3-bis-(phenylcarbamyl)propane |
| diphenylethylene | 2,4-dianilino-s-triazine; |
| 3,3'-dichlorobenzidine | 3,3'-dicarboxybenzidine |
| and | |

(e) nuclear substituted derivatives of the above, for example, containing COOH, COSH, methyl, nitro and/or sulphonic acid and/or chlorine atoms as substituents in the phenyl or naphthalene nuclei.

G is preferably substituted alkyl, especially $C_{1-4}$-substituted alkyl; substituted aralkyl, especially ($C_{1-3}$-alkyl)-substituted phenyl; substituted phenyl; and substituted naphthyl wherein at least one of the substituents are selected from B, —(CH$_2$)$_n$—B, —O—(CH$_2$)$_n$—B, —S—(CH$_2$)$_n$—B and NR$^8$(CH$_2$)$_n$—B in which B is CO$_2$H or COSH, especially CO$_2$H, n is an integer from 1 to 6 and $R^8$ is H or $C_{1-4}$-alkyl. Preferred examples of G include carboxyphenyl and dicarboxyphenyl.

The group —$NR^3$—G is derivable from the amino acids of formula $GNR^3H$, and examples of such amino acids include:

| | |
|---|---|
| 2-aminoisophthalic acid | 3-amino-4-fluorobenzoic acid |
| 4-aminoisophthalic acid | 3-amino-5-hydroxybenzoic acid |
| 5-aminoisophthalic acid | 3-amino-4-hydroxybenzoic acid |
| 3-aminophthalic acid | 3-amino-2-hydroxybenzoic acid |
| 4-aminophthalic acid | 2-amino-6-hydroxybenzoic acid |
| 2-aminoterephthalic acid | 2-amino-4-nitrobenzoic acid |
| 3-aminobenzoic acid | 3-amino-5-nitrobenzoic acid |
| 4-aminobenzoic acid | 2-nitro-3-aminobenzoic acid |
| 4-(methylamino)benzoic acid | 2-nitro-5-aminobenzoic acid |
| anthranilic acid | 3-nitro-4-aminobenzoic acid |
| 4-sulphoanthranilic acid | 3-acetylamino-5-aminobenzoic acid |
| 5-sulphoanthranilic acid | 3-amino-4-methylbenzoic acid |
| 2-amino-4-chlorobenzoic acid | 2-amino-3-methylbenzoic acid |
| 2-amino-5-chlorobenzoic acid | 3-amino-4-methoxybenzoic acid |
| 3-amino-4-chlorobenzoic acid | 3-amino-4-hydroxybenzoic acid |
| 5-amino-2-chlorobenzoic acid | 4-aminosalicylic acid |
| 2-amino-5-methylbenzoic acid | 5-aminosalicylic acid |
| 2-amino-6-methylbenzoic acid | 3-amino-2-naphthoic acid |
| 2-amino-5-bromobenzoic acid | 5-amino-2-naphthoic acid |
| Beta-alanine | 8-amino-2-naphthoic acid |
| Alanine | 2-n-butoxy-4-aminobenzoic acid |
| Asparagine | Arginine |
| Cystein | Aspartic acid |
| Glutamic acid | Cystine |
| Glycine | Glutamine |
| Hydroxylysine | Glycyl glycine |
| Isoleucine | Hydroxyproline |
| Lysine | Leucine |
| Phenylalanine | Methionine |
| Serine | Proline |
| Tryptophane | Threonine |
| Valine | Tyrosine |

It is to be understood that the present invention relates not only to compounds of Formula (1) but also to mixtures of compounds of Formula (1) and to the salts thereof, particularly the salt with an alkali metal, ammonia or an amine especially with ammonia or an amine which is volatile at room temperature.

According to a further aspect of the present invention there is provided a process for the preparation of compounds of Formula (1) comprising
(1) halo sulphonation of a metallo phthalocyanine using halo sulphonic acid, especially chlorosulphonic acid;
(2) condensation of the metallo phthalocyanine sulphonyl halide from (1) above with an amine of formula $HNR^1LNHR^2$;
(3) condensation of one equivalent of an amine of formula $GNHR^3$ with one equivalent of a linking group of formula halo-X-halo in which X is as defined above except that in place of Z there is a halogen radical;
(4) condensation of the product of (3) above with a product of step (2), preferably in the presence of base;
(5) condensation of the product from step (4) above with ZH to give a compound of formula (1);
wherein $R^1$, $R^2$, $R^3$, L, X, Z and G are as defined above.

The compounds of Formula (1) are especially useful for the preparation of inks, especially aqueous inks, used in ink jet printing and particularly thermal ink jet printing. The inks can be prepared according to known formulations.

The invention is further illustrated by the following Examples in which all parts and percentages are by weight unless otherwise indicated.

EXAMPLE 1

Preparation of the compound of Formula (5) in which G is 2-carboxyphenyl and Z is $NHCH_2CH_2OH$

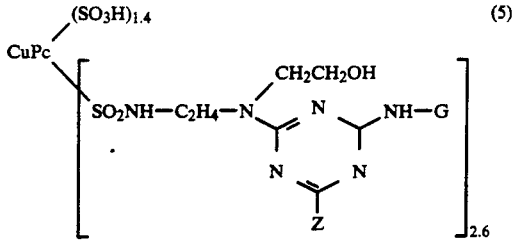

Copper phthalocyanine (45.4 g) was added to chlorosulphonic acid (220 g) over 1 hour maintaining the temperature below 60° C. It was then heated to 140° C. and stirred at this temperature for 3 hours. The mixture was cooled to 45° C. and phosphorus trichloride (23.6 g) added over 1½ hours at 40°–45° C. The mixture was then heated at 90°–95° C. for 16 hours. After cooling to 25° C. the mixture was added to ice/water (3 kg) and then filtered and washed with ice/water and pulled dry to give a paste.

The paste was added to 2-aminoethylaminoethanol (32.8 g) and water (200 ml) at 30° C. maintaining the pH at 10–10.5 by addition of sodium hydroxide solution. It was stirred at 38°–40° C. for 1 hour, the pH adjusted to 8.5 and then filtered, washed with saturated sodium chloride solution and then dried to give a copper phthalocyanine derivative which analysed as $CuPc(SO_3H)_{1.4}$-$(SO_2NHC_2H_4NHC_2H_4OH)_{2.6}$.

Anthranilic acid (2.7 g) was stirred in water (150 ml) at pH 7.5 and cooled to 0°–10° C. A solution of cyanuric chloride (3.6 g) in acetone (25 ml) was added at 0°–10° C. maintaining the pH at 7–8 by addition of 2N sodium hydroxide. The mixture was stirred for ½ hour at 0°–10° C. to give a dichlorotriazinyl anthranilic acid solution.

The above copper phthalocyanine derivative (7 g) and water (250 ml) were stirred and the pH adjusted to 11.0. The dichlorotriazinyl anthranilic acid solution was added at 20°–25° C. and the mixture stirred for 18 hours at pH 9–10. Ethanolamine (12.5 g) was then added and the temperature raised to 70° C. The mixture was stirred at 70°–75° C. for 6 hours, cooled to 25° C., acidified to pH 5 with concentrated hydrochloric acid and the product filtered to give a product paste.

The product paste was slurried in water (400 ml) and made alkaline to pH 9 with concentrated ammonium hydroxide. It was then added to a mixture of water (200 ml) and concentrated hydrochloric acid (20 ml). The product was filtered, reslurried in water (200 ml) and the pH adjusted to 9.0 with ammonium hydroxide. The solution was dialysed to remove chloride ion, screened and evaporated to give the ammonium salt of the title compound. Yield 8.3 g.

When made into an ink in water/diethylene glycol (92.5/7.5) and printed onto plain paper using a thermal ink-jet printing machine the ammonium salt of the title compound gave bright cyan shades with essentially 100% water fastness. The same water/diethylene glycol mixture was used as the solvent in the inks described in subsequent Examples.

EXAMPLE 2

Preparation of the compound of Formula (5) in which G is 3-carboxyphenyl and Z is $NHCH_2CH_2OH$ In place of the 2.7 g of anthranilic acid used in Example 1 there was used 2.7 g of m-aminobenzoic acid. The ammonium salt of the title product when made into an ink and printed onto plain paper using a thermal ink-jet printing machine gave cyan shades with excellent water fastness.

EXAMPLE 3

Preparation of the compound of Formula (5) in which G is 4-carboxyphenyl and Z is $NHCH_2CH_2OH$ In place of the 2.7 g of anthranilic acid used in Example 1 there was used 2.7 g of p-aminobenzoic acid. The ammonium salt of the title product when made into an ink and printed onto plain paper using a thermal ink-jet printing machine gave cyan shades with excellent water fastness.

EXAMPLE 4

Preparation of the compound of Formula (5) in which G is $CH_2CO_2H$ and Z is $NHCH_2CH_2OH$ In place of the 2.7 g of anthranilic acid used in Example 1 there was used 1.47 g of glycine. The ammonium salt of the title product when made into an ink and printed onto plain paper using a thermal ink-jet printing machine gave cyan shades with excellent water fastness.

EXAMPLE 5

The procedure described in Example 3 was repeated except that the ammonium hydroxide was replaced by methylamine. The methylammonium salt of the product when made into an ink and printed onto plain paper using a thermal ink jet printing machine gave cyan shades with excellent water fastness.

EXAMPLE 6

Preparation of the compound of Formula (5) in which G is 4-carboxyphenyl and Z is $N(CH_2CH_2OH)_2$ In place of the 12.5 g of ethanolamine used in Example 3 there was used 25.3 g of diethanolamine. The ammonium salt of the title product when made into an ink and printed onto plain paper using a thermal ink-jet printing machine gave cyan shades with excellent water fastness.

EXAMPLE 7

Preparation of the compound of Formula (5) in which G is 4-carboxyphenyl and Z is OH In place of the 12.5 g of ethanolamine used in Example 3 there was used 390 ml of 2N sodium hydroxide solution. The ammonium salt of the title product when made into an ink and printed onto plain paper using a thermal ink-jet printing machine gave cyan shades with excellent water fastness.

EXAMPLE 8

Preparation of the compound of Formula (5) in which G is 3,5-dicarboxyphenyl and Z is $NHCH_2CH_3OH$ In place of the 2.7 g of anthranilic acid used in Example 1 there was used 3.6 g of 5-aminoisophthalic acid. The ammonium salt of the title product when made into an ink and printed onto plain paper using a terminal ink-jet printing machine gave cyan shades with good water fastness.

EXAMPLE 9

Preparation of the compound of Formula (5) in which G is 3,5-dicarboxyphenyl and Z is morpholino In place of the 2.7 g of anthranilic acid used in Example 1 there was used 3.6 g of 5-aminoisophthalic acid and in place of the 12.5 g of ethanolamine there was used 17.8 g of morpholine. The ammonium salt of the title product when made into an ink and printed onto plain paper using a thermal ink-jet printing machine gave cyan shades with good water fastness.

EXAMPLE 10

Preparation of the compound of Formula (5) in which G is 3-carboxyphenyl and Z is morpholino In place of the 12.5 g of ethanolamine used in Example 2 there is used 17.8 g of morpholine. The ammonium salt of the title product when made into an ink and printed onto plain paper using a thermal ink-jet printing machine gives cyan shades with excellent water fastness.

EXAMPLE 11

Preparation of the compound of Formula (5) in which G is 4-carboxyphenyl and Z is $NHCH_2CO_2H$ In place of the 12.5 g of ethanolamine used in Example 3 there was used 15.4 g of glycine. The ammonium salt of the title product when made into an ink and printed onto plain paper using a thermal ink-jet printing machine gave cyan shades with excellent water fastness.

EXAMPLE 12

Preparation of the compound of Formula (5) in which G is 4-carboxyphenyl and Z is $NHCH_2CH_2SO_3H$ In place of the 12.5 g of ethanolamine used in Example 3 there was used 25.6 g of taurine. The ammonium salt of the title product when made into an ink and printed onto plain paper using a thermal ink-jet printing machine gave cyan shades with excellent water fastness.

EXAMPLE 13

Preparation of the compound of Formula (5) in which G is 2-methoxy-5-carboxyphenyl and Z is $NHCH_2CH_2OH$ In place of the 2.7 g of anthranilic acid used in Example 1 there is used 3.3 g of 3-amino-4-methoxybenzoic acid. The ammonium salt of the title product when made into an ink and printed onto plain paper using a thermal ink-jet printing machine gives cyan shades with excellent water fastness.

EXAMPLE 14

Preparation of the compound of Formula (5) in which G is 2-methyl-5-carboxyphenyl and Z is $NHCH_2CH_2OH$ In place of the 2.7 g of anthranilic acid used in Example 1 there is used 3.0 g of 3-amino-4-methylbenzoic acid. The ammonium salt of the title product when made into an ink and printed onto plain paper using a thermal ink-jet printing machine gives cyan shades with excellent water fastness.

EXAMPLE 15

Preparation of the compound of Formula (5) in which G is 2-carboxy-4-methylphenyl and Z is NHCH₂CH₂OH In place of the 2.7 g of anthranilic acid used in Example 1 there is used 3.0 g of 2-amino-5-methylbenzoic acid. The ammonium salt of the title product when made into an ink and printed onto plain paper using a thermal ink-jet printing machine gives cyan shades with excellent water fastness.

EXAMPLE 16

Preparation of the compound of Formula (5) in which G is 2-methyl-4-carboxyphenyl and Z is NHCH₂CH₂OH In place of the 2.7 g of anthranilic acid used in Example 1 there is used 3.0 g of 3-methyl-4-aminobenzoic acid. The ammonium salt of the title product when made into an ink and printed onto plain paper using a thermal ink-jet printing machine gives cyan shades with excellent water fastness.

EXAMPLE 17

Preparation of the compound of Formula (5) in which G is 2-carboxy-5-sulphophenyl and Z is NHCH₂CH₂OH In place of the 2.7 g of anthranilic acid used in Example 1 there was used 3.0 g of 2-amino-4-sulphobenzoic acid. The ammonium salt of the title product when made into an ink and printed onto plain paper using a thermal ink-jet printing machine gave cyan shades with excellent water fastness.

EXAMPLE 18

Preparation of the compound of Formula (5) in which G is 2-carboxy-5-sulphophenyl and Z is morpholino In place of the 12.5 g of ethanolamine used in Example 17 there was used 17.8 g of morpholine. The ammonium salt of the title product when made into an ink and printed onto plain paper using a thermal ink-jet printing machine gave cyan shades with excellent water fastness.

EXAMPLE 19

Preparation of the compound of Formula (5) in which G is 2-carboxy-4-sulphophenyl and Z is NHCH₂CH₂OH In place of the 2.7 g of anthranilic acid used in Example 1 there was used 4.3 g of 2-amino-5-sulphobenzoic acid. The ammonium salt of the title product when made into an ink and printed onto plain paper using a thermal ink-jet printing machine gave cyan shades with good water fastness.

EXAMPLE 20

Preparation of the compound of Formula (5) in which G is 3,4-dicarboxyphenyl and Z is NHCH₂CH₂OH In place of the 3.6 g of 5-aminoisophthalic acid used in Example 8 there is used 3.6 g of 4-aminophthalic acid. The ammonium salt of the title product when made into an ink and printed onto plain paper using a thermal ink-jet printing machine gives cyan shades with excellent water fastness.

EXAMPLE 21

Preparation of the compound of Formula (5) in which G is 2,5-dicarboxyphenyl and Z is NHCH₂CH₂OH In place of the 3.6 g of 5-aminoisophthalic acid used in Example 8 there is used 3.6 g of 2-aminoterephthalic acid. The ammonium salt of the title product when made into an ink and printed onto plain paper using a thermal ink-jet printing machine gives cyan shades with excellent water fastness.

EXAMPLE 22

Preparation of the compound of Formula (5) in which G is 3,5-dicarboxyphenyl and Z is n-C₄H₉

In place of the 12.5 g of ethanolamine used in Example 8 there is used 15.0 g of n-butylamine. The ammonium salt of the title product when made into an ink and printed onto plain paper using a thermal ink-jet printing machine gives cyan shades with excellent water fastness.

EXAMPLE 23

Preparation of the compound of Formula (5) in which G is 4-carboxybenzyl and Z is NHCH₂CH₂OH In place of the 2.7 g of anthranilic acid used in Example 1 there is used 3.0 g of 4-(aminomethyl)-benzoic acid. The ammonium salt of the title product when made into an ink and printed onto plain paper using a thermal ink-jet printing machine gives cyan shades with excellent water fastness.

EXAMPLE 24

Preparation of the compound of Formula (5) in which G is 3-carboxyphenyl and Z is 4-carboxybenzylamino In place of the 12.5 g of ethanolamine used in Example 2 there is used 10 g of 4-(aminomethyl)-benzoic acid. The ammonium salt of the title product when made into an ink and printed onto plain paper using a thermal ink-jet printing machine gives cyan shades with excellent water fastness.

We claim:

1. An anionic phthalocyanine compound which, in the free acid form, has the Formula (1):

wherein:
Pc is a Li, Na, K, Mg, Ca, Ba, Al, Si, Sn, Pb, Rh, Sc, Ti, V, Cr, Mn, Fe, Co, Zn, Ni or Cu-containing phthalocyanine nucleus;
$R^1$, $R^2$ and $R^3$ are each independently H, $C_{1-4}$-alkyl or hydroxy-$C_{1-4}$-alkyl;
L is a divalent aliphatic radical containing from 2 to 6 carbon atoms, benzylene, xylylene or a monocyclic radical of the benzene series;
each X independently is carbonyl or a group of formula (2), (3) or (4):

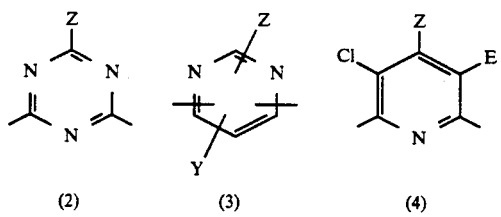

(2)      (3)      (4)

each Z independently is $NR^4R^5$, $SR^6$ or $OR^6$;
each Y independently is H, Cl or Z;
each E independently is Cl or CN;
$R^4$ and $R^5$ are each independently H, $C_{1-4}$-alkyl or substituted $C_{1-4}$-alkyl in which the substituents are selected from —COOH, —$SO_3H$ and —OH or $R^4$ and $R^5$ together with the nitrogen atom to which they are attached form a morpholine or piperidine ring;
$R^6$ is selected from $C_{1-4}$-alkyl and hydroxy-$C_{1-4}$-alkyl
G is a colourless $C_{1-4}$-substituted alkyl, ($C_{1-3}$-alkyl)-substituted phenyl, substituted phenyl or substituted naphthyl radical wherein the substituent is selected from B, —$(CH_2)_n$—B, —O—$(CH_2)_n$—B, —S—$(CH_2)_n$—B, and —$NR^8(CH_2)_n$—B in which B is $CO_2H$ or COSH, n is an integer from 1 to 6 and $R^8$ is H or $C_{1-4}$-alkyl; and
(t+q) is from 3 to 4 inclusive.

2. A compound according to claim 1 wherein the phthalocyanine nucleus contains a nickel or copper atom.

3. A compound according to claim 1 wherein X is a group of Formula (2) and Z is $NR^4R^5$ or $OR^6$ wherein $R^4$, $R^5$ and $R^6$ are as defined in claim 1.

4. A compound according to claim 3 wherein Z is —NH($C_{1-4}$-alkylene)OH.

5. A compound according to claim 4 wherein Z is —$NHC_2H_4OH$.

6. A compound according to claim 1 wherein the value of q is greater than or equal to the value of t.

7. A compound according to claim 1 wherein G is carboxyphenyl and dicarboxyphenyl.

8. An anionic phthalocyanine compound which, in the free acid form, has the Formula (1):

$$Pc(SO_3H)_t(SO_2-NR^1-L-NR^2-X-NR^3-G)_q \quad (1)$$

wherein:
Pc is a nickel- or copper-containing phthalocyanine nucleus; $R^1$, $R^2$ and $R^3$ are each independently H, $C_{1-4}$-alkyl or hydroxy $C_{1-4}$-alkyl;
L is a divalent aliphatic containing from 2 to 6 carbon atoms or a group selected from:

| | |
|---|---|
| 1,3- or 1,4-phenylene | 2-nitro-1,4-phenylene |
| 3-sulpho-1,4-phenylene | 4-methoxy-1,3-phenylene |
| 4-sulpho-1,3-phenylene | 4-nitro-1,3-phenylene |
| 2-carboxy-1,4-phenylene | 2-chloro-1,4-phenylene |
| 4-carboxy-1,3-phenylene | 3,7-disulpho-1,5-naphthylene |
| 2-methoxy-1,4-phenylene | |
| diphenyl | azobenzene |
| diphenyloxide | diphenyloxadiazole |
| diphenylamine | benzanilide |
| diphenylsulphide | diphenylurea |
| diphenylsulphone | 1,2-bis(phenylcarbamyl)ethylene |
| diphenylmethane | 1,4-bis-(phenylcarbamyl)butadiene |
| diphenylketone | 1,2-bis-(phenylcarbamyl)ethane |
| diphenylethane | 1,3-bis-(phenylcarbamyl)propane |
| diphenylethylene | 2,4-dianilino-s-triazine |
| 3,3'-dichlorobenzidine and | 3,3'-dicarboxybenzidine; | each X independently is carbonyl or a group of formula (2), (3) or (4):

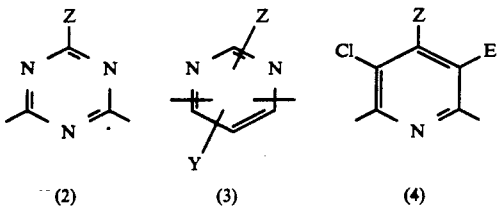

(2)      (3)      (4)

each Z independently is $NR^4R^5$, $SR^6$ or $OR^6$;
each Y independently is H, Cl or Z;
each E independently is Cl or CN;
$R^4$ and $R^5$ are each independently H or $C_{1-4}$-alkyl or $R^4$ and $R^5$ together with the nitrogen atom to which they are attached form a morpholine or piperidine ring;
$R^6$ is $C_{1-4}$alkyl; the group —$NR^3G$ is derived from an amino acid of Formula $GNR^3H$ selected from:

| | |
|---|---|
| 2-aminoisophthalic acid | 3-amino-4-fluorobenzoic acid |
| 4-aminoisophthalic acid | 3-amino-5-hydroxybenzoic acid |
| 5-aminoisophthalic acid | 3-amino-4-hydroxybenzoic acid |
| 3-aminophthalic acid | 3-amino-2-hydroxybenzoic acid |
| 4-aminophthalic acid | 2-amino-6-hydroxybenzoic acid |
| 2-aminoterephthalic acid | 2-amino-4-nitrobenzoic acid |
| 3-aminobenzoic acid | 3-amino-5-nitrobenzoic acid |
| 4-aminobenzoic acid | 2-nitro-3-aminobenzoic acid |
| 4-(methylamino)benzoic acid | 2-nitro-5-aminobenzoic acid |
| anthranilic acid | 3-nitro-4-aminobenzoic acid |
| 4-sulphoanthranilic acid | 3-acetylamino-5-aminobenzoic acid |
| 5-sulphoanthranilic acid | 3-amino-4-methylbenzoic acid |
| 2-amino-4-chlorobenzoic acid | 2-amino-3-methylbenzoic acid |
| 2-amino-5-chlorobenzoic acid | 3-amino-4-methoxybenzoic acid |
| 3-amino-4-chlorobenzoic acid | 3-amino-4-hydroxybenzoic acid |
| 5-amino-2-chlorobenzoic acid | 4-aminosalicylic acid |
| 2-amino-5-methylbenzoic acid | 5-aminosalicylic acid |
| 2-amino-6-methylbenzoic acid | 3-amino-2-naphthoic acid |
| 2-amino-5-bromobenzoic acid | 5-amino-2-naphthoic acid |
| Beta-alanine | 8-amino-2-naphthoic acid |
| Alanine | 2-n-butoxy-4-aminobenzoic acid |
| Asparagine | Arginine |
| Cystein | Aspartic acid |
| Glutamic acid | Cystine |
| Glycine | Glutamine |
| Hydroxylysine | Glycyl glycine |
| Isoleucine | Hydroxyproline |
| Lysine | Leucine |
| Phenylalanine | Methionine |
| Serine | Proline |
| Tryptophane | Threonine |
| Valine and | Tyrosine; and |

(t+q) is from 3 to 4 inclusive.

9. A compound according to claim 8 wherein L is a divalent aliphatic radical containing from 2 to 6 carbon atoms.

10. A compound according to claim 9 wherein L is ethylene, trimethylene, propylene or tetramethylene.

11. A compound according to claim 8 wherein the amino acid of formula $GNR^3H$ is selected from:

| | |
|---|---|
| 5-aminoisophthalic acid | 3-amino-4-hydroxybenzoic acid |
| 3-aminophthalic acid | 3-amino-2-hydroxybenzoic acid |
| 4-aminophthalic acid | 2-amino-6-hydroxybenzoic acid |
| 2-aminoterephthalic acid | 2-amino-4-nitrobenzoic acid |

| | |
|---|---|
| 3-aminobenzoic acid | 3-amino-5-nitrobenzoic acid |
| 4-aminobenzoic acid | 2-nitro-3-aminobenzoic acid |
| 4-(methylamino)benzoic acid | 2-nitro-5-aminobenzoic acid |
| anthranilic acid | 3-nitro-4-aminobenzoic acid |
| 4-sulphoanthranilic acid | 3-acetylamino-5-aminobenzoic acid |
| 5-sulphoanthranilic acid | 3-amino-4-methylbenzoic acid |
| 2-amino-4-chlorobenzoic acid | 2-amino-3-methylbenzoic acid |
| 2-amino-5-chlorobenzoic acid | 3-amino-4-methoxybenzoic acid |
| 3-amino-4-chlorobenzoic acid | 3-amino-4-hydroxybenzoic acid |
| 5-amino-2-chlorobenzoic acid | 4-aminosalicylic acid |
| 2-amino-5-methylbenzoic acid | 5-aminosalicylic acid |
| 2-amino-6-methylbenzoic acid | 3-amino-2-naphthoic acid |
| 2-amino-5-bromobenzoic acid | 5-amino-2-naphthoic acid |
| 8-amino-2-naphthoic acid and | 2-n-butoxy-4-aminobenzoic acid. |

12. A compound according to claim 9 wherein the group —NR$^3$G is carboxyphenylamino or dicarboxyphenylamino.

13. An anionic phthalocyanine compound which, in the free acid form, has the Formula (1):

$$Pc(SO_3H)_t(SO_2-NR^1-L-NR^2-X-NR^3-G)_q \quad (1)$$

wherein:
Pc is a nickel- or copper-containing phthalocyanine nucleus;
R$^1$, R$^2$ and R$^3$ are each independently H or C$_{1-4}$-alkyl;
L is a divalent aliphatic radical containing from 2 to 6 carbon atoms;
each X independently is carbonyl or a group of formula (2), (3) or (4):

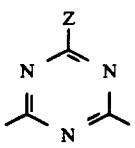 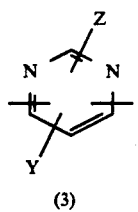 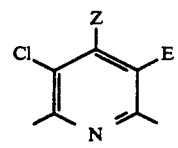

(2)  (3)  (4)

each Z independently is NR$^4$R$^5$, SR$^6$ or OR$^6$;
each Y independently is H, Cl or Z;
each E independently is Cl or CN;
R$^4$ and R$^5$ are each independently H, C$_{1-4}$-alkyl, -HO(C$_{1-4}$-alkylene) or R$^4$ and R$^5$ together with the nitrogen atom to which they are attached form a morpholine or piperidine ring;
R$^6$ is C$_{1-4}$alkyl or hydroxy-C$_{1-4}$-alkyl
G is carboxyphenyl or dicarboxyphenyl; and
(t+q) is from 3 to 4 inclusive.

14. A compound according to claim 13 wherein the phthalocyanine nucleus contains a copper atom.

15. A compound according to claim 13 wherein X is a group of Formula (2) and Z is NR$^4$R$^5$ or OR$^6$ wherein R$^4$, R$^5$ and R$^6$ are as defined in claim 13.

16. A compound according to claim 15 wherein Z is —NH(C$_{1-4}$-alkylene)OH.

17. A compound according to claim 15 wherein Z is —NHC$_2$H$_4$OH.

* * * * *